Oct. 7, 1941.   C. R. PATON   2,258,067
MOTOR VEHICLE
Original Filed May 7, 1938

INVENTOR.
Clyde R. Paton
BY
Tibbetts & Hart
ATTORNEYS

Patented Oct. 7, 1941

2,258,067

UNITED STATES PATENT OFFICE 2,258,067

MOTOR VEHICLE

Clyde R. Paton, Birmingham, Mich., assignor to Packard Motor Car Company, Detroit, Mich., a corporation of Michigan Original application May 7, 1938, Serial No. 206,646. Divided and this application September 22, 1939, Serial No. 296,106

3 Claims. (Cl. 267—54)

This invention relates to elastic suspension systems for vehicles and more particularly to connecting means between road wheel carrying leaf springs and the frame. This application is a division of my application Serial No. 206,646, filed May 7, 1938.

For many years it has been customary in suspension systems to form leaf springs with eyes for receiving bolts that are carried by connecting means, such as hangers or shackles, pivotally or rigidly attached to the frame. More recently cylindrical rubber bushings have been utilized between the bolts and the spring eyes to damp vibrational disturbances developed by the road wheels so that they will not be transmitted to the body. In some instances the bushings are longer than the spring eyes and are compressed between the shackle or hanger plates by turning up the nuts on the bolts thus compressing the sleeves in an axial direction so that they will be radially expanded to frictionally engage the spring eyes. This axial compression of such bushings causes them to flow radially as flanges between the ends of the spring eye and the plates so that they are frictionally engaged thereby. These rubber bushings absorb vibration in the spring connections and allow pivotal and axial movement of the spring eyes relative to the bolts, thus materially improving riding comfort.

It has been found that rubber bushings of the character specified are short-lived because of chafing caused by constant friction of the shackles or hangers and the spring eyes against the flanges, and it is a purpose of this invention to eliminate this undesirable condition while maintaining all the advantages of the bushings.

Another object of the invention is to provide a spring eye bushing of considerably greater length than the spring eye that can be axially compressed between a spring eye and shackle without the protrusion of a flange therebetween.

Still another object of the invention is to provide a rubber sleeve that will expand radially to a greater extent in its central portion than at its end portions when placed in compression in an axial direction.

Other objects of the invention will appear from the following description taken in connection with the drawing, which forms a part of this specification, and in which.

Figure 1:
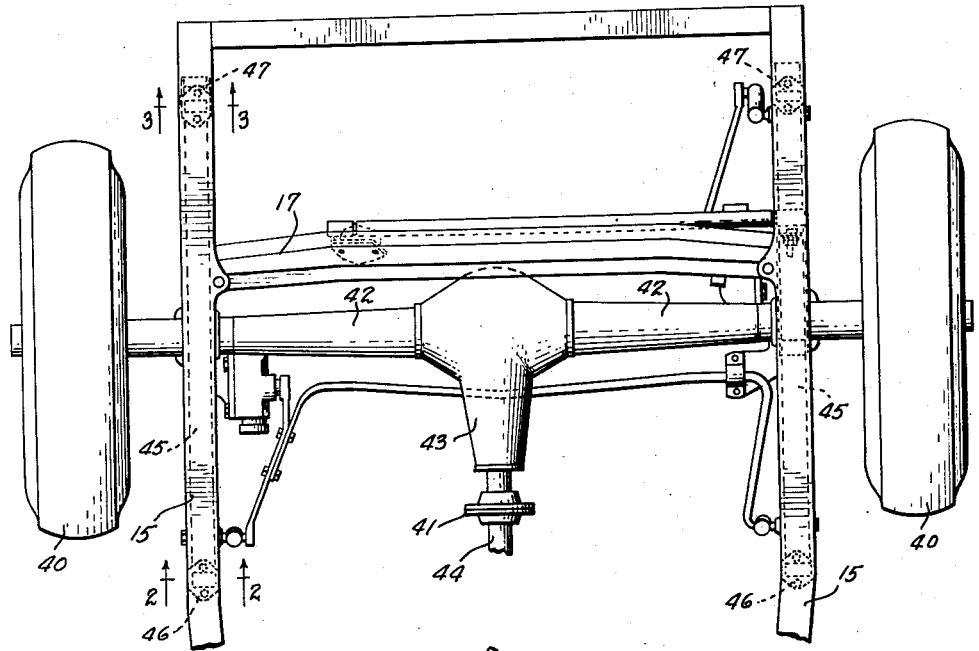
Fig. 1 is a plan view of the rear end of a motor vehicle chassis showing the vehicle frame and rear suspension means.

The vehicle frame illustrated in the drawing comprises longitudinally extending side frame members 15 and a rearward cross frame member 17, and may include various other structural reinforcing members which are not required to be shown in order that the invention may be understood.

The rear road wheels 40, which preferably constitute the driving wheels of the vehicle, are supported on transversely extending axle housings 42, each of which is secured to a centrally disposed differential casing 43. It will be understood that the road wheels are driven through live axles within the housing 42 from gearing within the differential housing 43, this gearing being in turn driven upon a drive shaft 44 which shaft extends forwardly to the vehicle power plant, not shown. The drive is of the well known Hotchkiss type which employs no torque tube about the drive shaft, universal joints being interposed in the drive shaft adjacent the differential housing and the power plant, one of these joints being indicated at 41. In this system of drive the braking and driving torque on the axle and differential housing is normally resisted solely by the vehicle suspension springs.

The suspension system selected for the purpose of illustration includes leaf spring assemblies 45, one of which is disposed at each side of the vehicle. Each spring assembly is associated with the frame by connecting means in the form of a hanger 46 at its forward end and by a shackle 47 at its rearward end. Spring hanger 46 may be secured to the lower flange of the adjacent side frame member 15, and may be generally U-shaped in section as shown more particularly in Fig. 2, the legs of the hanger being apertured at 51 and 53 respectively, to permit the passage therethrough of a spindle, in the form of a bolt 48, and retained in position on the hanger by a nut 49. Surrounding the bolt 48 is a bushing 50 of rubber or similar deformable material, this bushing being received in the spring eye 52 formed at the forward end of the spring. A collar 55 is secured to one end of the bolt 48 and fits snugly within aperture 53, it being noted that this aperture is sufficiently large to permit the passage therethrough of the rubber bushing 50.

It will be noted that the bushing 50 is formed with a central body portion which is initially of such diameter that it may be introduced without difficulty in the spring eye 52, each of the end portions of the bushing having assembled thereon an annular band 54. As the nut 49 is threaded on the bolt 48, the bushing is compressed between the collar 55 and the opposite leg of the hanger 46, so that the rubber is radially expanded, and is forced with considerable pressure against the inner surface of the eye 52 and the outer surface of the bolt 48, compression being limited by the shoulder 62 on the bolt. Radial expansion of the end portions of the bushing is restricted to some extent by the bands 54, which permit the axial compression of a relatively long bushing and at the same time prevent excessive radial flow of rubber and the formation of unnecessarily large flanges at the ends of the bushing which would otherwise become chafed by rubbing against the legs of the hanger and the ends of the spring eye and require frequent replacement. If desired, a split ring 56, seated in an annular recess in the spring eye, may be employed to prevent endwise displacement of the bushing 50 in the eye, but this is ordinarily not necessary provided the bushing is sufficiently compressed and expanded, the rubber being in effect surface bonded by friction to the metal surfaces with which it is contacted under pressure.

Figures 2, 3:
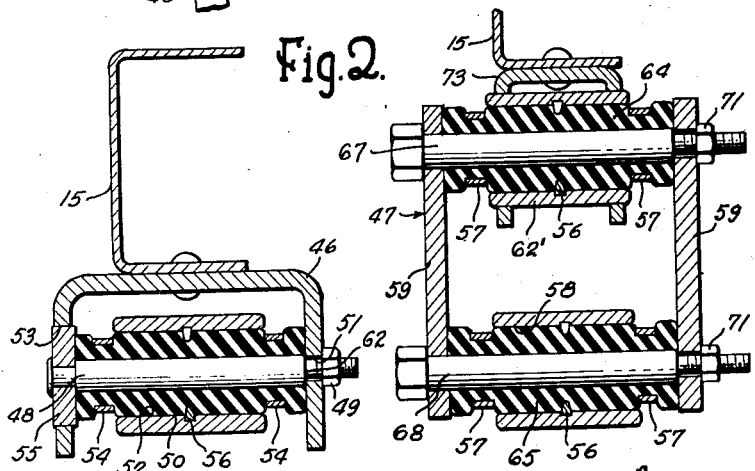
Fig. 2 is a section on line 2—2 of Fig. 1, showing the mounting for the front end of a spring.
Fig. 3 is a section on line 3—3 of Fig. 1, showing the mounting for the rear end of a spring.

Turning now to Figure 3, which illustrates one method of connecting the rear end of each leaf spring assembly to the frame, it will be observed that the construction is generally similar to that just described, the eye 58 at the rear of the spring assembly being received between plate members 59 which constitute the shackle 47. Also received between the members 59 and the shackle is a sleeve 62'. Embraced by the sleeve 62' and the eye 58 are bushings indicated at 64 and 65 respectively, these bushings being generally similar to the bushing 50 heretofore referred to and being formed of resilient material such as rubber. The bushing 64 is received on a spindle or bolt 67 and the bushing 65 on a spindle or bolt 68. The members 59 are apertured to receive the reduced end portions of these bolts, each bolt being threaded at one end to receive a nut 71. The end portions of the bushings 64 and 65 are surrounded by annular bands 57 and split rings 56 may be employed to prevent endwise displacement of the bushings within the spring eye 58 and the sleeve 62' as in the construction shown in Figure 2. The sleeve 62' is secured in apertures in the arms of a yoke member 73, the latter being in turn secured to the lower flange of the adjacent side frame member 15.

Figure 4:
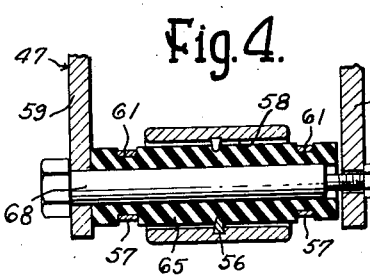
Fig. 4 is a sectional view corresponding to a portion of Fig. 3, showing several elements of the mounting in completely assembled relation.

Figure 4 illustrates the lower portion of the shackle just described prior to the application of axial pressure to the rubber bushing 65. It will be noted that the annular bands 57 are received in recesses 61 in the bushing and they may be vulcanized in these recesses. The end portions of the bushing are of less diameter than the central portion thereof and the latter is dimensioned so that it may be readily received in the spring eye 58. As the nut 71 is tightened, axial pressure is applied to the bushing which causes the central portion thereof to expand and grip tightly the eye 58 and the bolt 68. The end portions of the bushings are likewise expanded radially, but such expansion is limited by the bands 57. The initial length of the bushing is such that after compression there is a sufficient length of the bushing interposed between shackle members 59 and the ends of the spring eye 58 to permit considerable lateral movement of the spring eye within the shackle and to permit rotation of the spring eye as the spring is flexed without chafing or applying undue stress to the end portions of the bushing.

Figure 5:
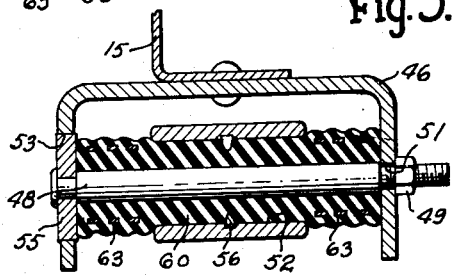
Fig. 5 is a sectional view corresponding to Fig. 2, illustrating a modified construction mounting.

Turning now to Figure 5, it will be observed that a modification of the structure just described is disclosed. The device is here illustrated as applied to the connection between the forward end of the spring and the body; the application of this modified form to the shackle at the rear of the spring is obvious.

All of the elements of this modification correspond to those of Figure 2 with the exception of the bushing and corresponding reference characters are used to identify them. The bushing, indicated at 60, is of rubber or other deformable material and is of generally cylindrical shape, being considerably longer than the space between the legs of the spring hanger 46 even after compression. In lieu of the annular bands 54 employed in the form of the invention shown in Figure 2 to prevent excessive spreading or radial flow of rubber at the ends of the bushing as the result of compression, a coil spring 63 is embedded in the bushing at each end portion thereof. As the bushing is compressed, both during the assembling thereof and in subsequent operation as the result of relative lateral movement of the hanger and the spring eye 52, the spring is of course accordingly compressed and thus supports the bushing in yieldingly opposing such lateral movement.

It will be observed that by these constructions the spring is completely insulated from the frame by the resilient material of which the bushings are formed so as to prevent the transmission of vibrational disturbances and shock to the frame and to reduce the stresses applied to the spring assemblies during operation of the vehicle, the rubber yielding in response to forces tending to twist the spring and readily permitting the ordinary flexing of the spring to accommodate rising and falling movement of the wheels. Again, the lateral freedom of movement between the leaf springs and the body which is permitted by these constructions is sufficient to materially reduce and cushion any lateral impact or shock which would otherwise be applied to the body as the vehicle passes over an uneven road bed. Because of the means applied to the bushings to restrict radial flow upon axial compression, the bushings will not have flanges between the spring eyes and the hangers or shackles that will become readily chafed.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. A mounting for a vehicle leaf spring eye comprising a spindle extending through the eye, supporting means for the ends of the spindle carried by the vehicle, a rubber bushing surrounding the portion of said spindle between the supporting means, said bushing being normally of smaller diameter throughout its length than the interior diameter of said eye, circular collars anchored around the bushing outside and adjacent the ends of the eye, said collars being smaller in diameter than the interior of the spring eye, and means for applying axial pressure upon the ends of the bushing to radially expand the portion of the bushing between the collars into frictional contact with the eye and the spindle, said collars preventing radial flow of the bushing at the ends of the spring eye.

2. In a mounting for a vehicle leaf spring eye, a spindle projecting through the eye, supporting means for the ends of the spindle carried by the vehicle, a rubber bushing surrounding said spindle and extending between the supporting means having the end portions outside of and adjacent the spring eye, each formed with a circular peripheral groove therein, said bushing being normally of smaller diameter throughout its length than the interior diameter of the eye, rigid collars lying within the bushing grooves, and means for applying axial pressure against the ends of the bushing to radially expand the bushing portion between the grooves into frictional contact with the eye and the spindle, said collars preventing radial expansion of the bushing adjacent the ends of the eye.

3. A mounting for a vehicle leaf spring eye comprising a spindle extending through the eye, supporting means for the ends of the spindles carried by the vehicle, a rubber bushing surrounding the portion of said spindle intermediate the supporting means, said bushing being normally of smaller diameter throughout its length than the interior diameter of said eye, circular collars anchored around the bushing outside and adjacent the ends of the eye, said collars being smaller in diameter than the interior of the spring eye, anchor means fixed to the interior of the spring eye and projecting radially inwardly thereof into the peripheral portion of the bushing for anchoring the same, and means for applying axial pressure upon the ends of the bushing to radially expand the portion of the bushing between the collars and into frictional contact with the eye and the spindle, said collars preventing radial flow of the bushing adjacent the ends of the spring eye.

CLYDE R. PATON.